(12) United States Patent
Raboisson et al.

(10) Patent No.: US 10,809,930 B2
(45) Date of Patent: Oct. 20, 2020

(54) CONFIGURING AN EMBEDDED SUBSCRIBER IDENTITY MODULE

(71) Applicant: IDEMIA FRANCE, Courbevoie (FR)

(72) Inventors: Aurélien Raboisson, Courbevoie (FR); Jérôme Dumoulin, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 62 days.

(21) Appl. No.: 16/284,492

(22) Filed: Feb. 25, 2019

(65) Prior Publication Data

US 2019/0265901 A1    Aug. 29, 2019

(30) Foreign Application Priority Data

Feb. 26, 2018   (FR) ...................................... 18 51650

(51) Int. Cl.
| | | |
|---|---|---|
| *G06F 12/00* | (2006.01) | |
| *G06F 3/06* | (2006.01) | |
| *G06F 8/65* | (2018.01) | |
| *H04W 8/18* | (2009.01) | |
| *H04L 29/08* | (2006.01) | |
| *H04W 12/00* | (2009.01) | |

(52) U.S. Cl.
CPC .......... *G06F 3/0644* (2013.01); *G06F 3/0604* (2013.01); *G06F 8/65* (2013.01); *H04L 67/34* (2013.01); *H04W 8/183* (2013.01); *H04W 12/0023* (2019.01)

(58) Field of Classification Search
None
See application file for complete search history.

(56) References Cited

U.S. PATENT DOCUMENTS

| | | |
|---|---|---|
| 8,607,208 B1 | 10/2013 | Arnold et al. |
| 9,053,107 B1 | 9/2015 | Le |
| 2007/0288531 A1 | 12/2007 | Motta |

(Continued)

FOREIGN PATENT DOCUMENTS

| | | |
|---|---|---|
| EP | 2448216 A1 | 5/2012 |
| EP | 3023904 A1 | 5/2016 |

OTHER PUBLICATIONS

European Search Report cited in corresponding European Patent Application No. 19159268.2 dated Mar. 20, 2019, pp. 1-9.

(Continued)

*Primary Examiner* — Jason W Blust
(74) *Attorney, Agent, or Firm* — MH2 Technology Law Group, LLP (57) ABSTRACT

An embedded subscriber identity module (2) includes: a first memory zone (Z1) for storing an operating system (OS1); a second memory zone (Z2) for storing user data (DT) in memory that is accessible by the operating system (OS1); and a third memory zone (Z3) for storing a data model (MD) defining at least one criterion (CT) that is to be complied with by the user data (DT) contained in the second memory zone (Z2). The embedded subscriber identity module (2) further includes a determination module (8) configured to determine whether the user data (DT) complies with the at least one criterion; and a processor module (10) configured to cause at least one first predetermined action as defined in the data model (MD) to be executed if the user data (DT) is not in compliance with the at least one criterion.

16 Claims, 2 Drawing Sheets

(56) References Cited

U.S. PATENT DOCUMENTS

2012/0042376 A1* 2/2012 Dolgunov ............. G06F 9/4406
                                                     726/19
2012/0108207 A1   5/2012 Schell et al.
2017/0269918 A1   9/2017 Dumoulin et al.
2018/0249332 A1*  8/2018 Schell .................... G06F 21/45

OTHER PUBLICATIONS

Preliminary Search Report dated Sep. 18, 2018 in corresponding FR Application No. 1851650, 2 pages.

* cited by examiner

| DT | CR |
|---|---|
| DT1 | CR1 |
| DT2 | CR2 |
| DT3 | CR3 |

FIG.3

| CT | AT | |
|---|---|---|
| | AT1 | AT2 |
| CT1 | AT11 | AT21 |
| CT2 | AT12 | AT22 |
| CT3 | AT13 | AT23 |

CONFIGURING AN EMBEDDED SUBSCRIBER IDENTITY MODULE

CROSS-REFERENCE TO RELATED APPLICATIONS

This application claims priority to French Application No. 1851650 filed 26 Feb. 2018, the entire disclosure of which is hereby incorporated by reference in its entirety.

BACKGROUND OF THE INVENTION

The invention relates to the field of telecommunications, and it relates more particularly to embedded subscriber identity modules (typically an electronic chip or a smart card), also referred to as secure elements (SEs), as used in a terminal, and serving for example, to host applications and data in secure manner in a trusted environment.

An embedded subscriber identity module in a telecommunications terminal may be in various forms, and in particular it may present various form factors (or formats). Thus, an embedded subscriber identity module may be in the form of a SIM card (also known as a universal integrated circuit card (eUICC), or an embedded SIM (eSIM) card, also known as an eUICC. Another example of a secure element is an embedded secure element (eSE), which is generally soldered to the host terminal.

Below, in order to simplify the description, the principles of the invention are described in the context of a SIM card. This does not constitute any kind of limitation, and the principles of the invention are applicable to the various different types of secure element (e.g. SIM, eSIM, eUICC, SE, or eSE card, or a combination of secure elements).

The invention relates in particular to configuring an embedded subscriber identity module in order to avoid the occurrence of errors or bugs.

In known manner, a SIM card may have in its memory user data (keys, identifiers, etc.), also referred to as subscriber data, that is accessible to the operating system of said card. The operating system can read the user data while the SIM card is in operation, e.g. in order to recover the international mobile subscriber identity (IMSI) of the user in a mobile network.

It is also known to update the operating system of a SIM card, e.g. in order to improve the operating system, to remove bugs, or to add new functions. Nevertheless, such updating can give rise to problems in the operation of the SIM card.

Specifically, it is possible that once the operating system has been updated, it requires a format or a type that is different from that used by the user data actually stored in the memory of the SIM card. After updating, the user data present in the SIM card might no longer be compatible with the data now expected by the operating system, which runs the risk of leading to problems of operation and giving rise to errors.

By way of example, an update may configure the operating system of a SIM card in such a manner that it expects to read an additional byte in a configuration file stored in the user data in said card. If that byte is not present when reading the file, that can constitute an obstacle to configuring the operating system. In another example, if the update of the operating system of the SIM card makes provision for adding a function, that function might not be usable by the operating system unless the necessary files are present in the user data, and that can give rise to errors and can degrade the operation of the SIM card.

A need exists to mitigate the problems and drawbacks mentioned in this document, which can be encountered by any kind of embedded subscriber identity module, such as a SIM, eSIM, eUICC, eSE, etc. card.

OBJECT AND SUMMARY OF THE INVENTION

As explained above, problems can arise in a SIM card, in particular when its operating system is updated, insofar as such updating can modify the format or the type of user data that is required by the operating system in order to operate appropriately.

Unfortunately, during such updating of the operating system, any user data stored in memory in the SIM card is not modified by the update. Access to user data while updating the operating system is generally not possible, in particular for reasons of access rights and confidentiality.

Updating a SIM card can thus have the consequence of the user data as stored in said card no longer being compatible with the operating system once it has been updated.

The invention thus seeks to configure an embedded subscriber identity module, such as a SIM card, an eUICC module, etc., in such a manner that its operating system is capable of functioning appropriately, in particular when the operating system (but not the user data) has been updated. In other words, the invention serves to avoid errors arising because of incompatibility between the operating system and the user data, in particular as a result of the operating system of an embedded subscriber identity module being updated.

For this purpose, the present invention provides an embedded subscriber identity module comprising:
  a first memory zone configured to store an operating system in memory; and
  a second memory zone configured to store user data in memory that is accessible by the operating system;
the embedded subscriber identity module further comprising:
  a third memory zone, distinct from the first and second memory zones, configured to store a data model in memory defining at least one criterion that is to be complied with by the user data contained in the second memory zone;
  a determination module configured to determine whether said user data complies with said at least one criterion; and
  a processor module configured to cause at least one first predetermined action as defined in the data model to be executed if said user data is not in compliance with said at least one criterion.

In a particular embodiment, the determination module is configured, on detecting that the operating system has been updated, to determine whether said user data complies with said at least one criterion. In other words, the determination module proceeds with said determination in response to detecting that the operating system has been updated.

In a particular embodiment, if said user data does not comply with said at least one criterion, the embedded subscriber identity module is configured:
  to consult the data model in the third memory zone in order to determine said at least one first predetermined action; and
  to cause the operating system to execute said at least one first predetermined action.

In a particular embodiment, if said user data complies with said at least one criterion, the operating system is configured to execute at least one second predetermined action, different from said first predetermined action.

In a particular embodiment, said at least one second predetermined action is defined in the data model in association with said user data.

In a particular embodiment, said at least one second predetermined action is not defined in the data model.

In a particular embodiment, said at least one second predetermined action is not executed by the operating system.

In a particular embodiment, said at least one second predetermined action does not modify the user data.

In an embodiment, the data model is not consulted in order to determine said at least one second predetermined action. By way of example, said at least one second action is specified in the operating system.

In a particular embodiment, said at least one criterion comprises at least one of the following:
- a predetermined data type;
- a predetermined length or format for a string of data bits/bytes;
- a predetermined bit/byte position in a given string of bits/bytes;
- a presence condition (data actually present or not present in memory) indicating whether user data is to be present or not present in the second memory zone;
- a location (e.g. a memory address) in the second memory zone;
- a value;
- a threshold;
- a content value; and
- a predetermined data state.

The list of criteria given above is given for illustrative and nonlimiting purposes. Other types of criteria may be used by the person skilled in the art.

In a particular embodiment, the data model defines a plurality of criteria to be satisfied by the user data;
  the determination module being configured to determine whether the user data complies with each of said criteria; and
  the processor module being configured to perform at least said at least one first predetermined action defined in the data model if said user data does not comply with at least one of said criteria.

In a particular embodiment, the embedded subscriber identity module comprises an updating module configured:
  to receive an updating command comprising first updating data relating to the operating system in association with the second updating data relating to the data model; and
  to update the operating system from the first updating data and to update the data model from the second updating data.

In an embodiment, the determination module is configured to determine whether said user data present in the second memory zone complies with said at least one criterion defined in the data model once said data model has been updated (i.e. in response to updating the data model) by using the second updating data. In a particular example, this verification performed by the determination module is performed on all of the user data present in the second memory zone.

In a particular embodiment, the determination module is configured to determine whether said user data present in the second memory zone complies with said at least one criterion defined in the data model once the operating system has been updated (i.e. in response to the operating system being updated) by using the first updating data. In a particular example, this verification performed by the determination module is performed on all of the user data present in the second memory zone once the operating system has been updated.

In a particular embodiment, the determination module is configured to determine whether said user data present in the second memory zone complies with said at least one criterion defined in the data model once both the operating system and the data model have been updated respectively by using the first updating data and by using the second updating data (i.e. in response to these two updates). In a particular example, this verification performed by the determination module is performed on all of the user data present in the second memory zone once the operating system and the data model have been updated.

In an embodiment, the invention is performed by means of software and/or hardware components. In this context, the term "module" as used in this document may correspond equally well to a software component or to a hardware component or to a combination of hardware and of software components.

The invention also provides a processing method performed by an embedded subscriber identity module comprising:
  a first memory zone storing an operating system;
  a second memory zone storing user data accessible by the operating system; and
  a third memory zone, distinct from the first and second memory zones, storing a data model defining at least one criterion that is to be complied with by the user data contained in the second memory zone;
  the method comprising the following steps:
  determining whether said user data complies with said at least one criterion defined in the data model; and
  if said user data is not in compliance with said at least one criterion, triggering execution of at least one first predetermined action defined in the data model.

It should be observed that the various embodiments mentioned above with reference to the embedded subscriber identity module of the invention and the associated advantages apply in analogous manner to the processing method of the invention.

In an implementation, the method comprises:
  updating the operating system in the first memory zone;
  wherein said determination of whether the user data complies with said at least one criterion defined in the data model is performed on detecting that the operating system has been updated.

In an implementation, if said user data is not in compliance with said at least one criterion, the triggering step comprises:
  consulting the data model in the third memory zone in order to determine said at least one first predetermined action; and
  triggering the operating system to execute said at least one first predetermined action.

In an implementation, the method is such that, if said user data complies with said at least one criterion, the operating system is configured to execute at least one second predetermined action, different from said first predetermined action.

In an implementation, the method comprises consulting the data model in order to determine said at least one second predetermined action defined in the data model in association with said user data.

In an implementation, the data model is not consulted in order to determine said at least one second predetermined action executed by the operating system.

In an implementation, said at least one second predetermined action is not executed by the operating system.

In a particular implementation, said at least one second predetermined action does not modify said user data.

In an implementation, said determination of whether said user data complies with said at least one criterion defined in the data model is performed on detecting that the data model has been updated using the second updating data.

In an implementation, said at least one criterion comprises at least one of the following:
- a predetermined data type;
- a predetermined length or format for a string of data bits/bytes;
- a predetermined bit/byte position in a given string of bits/bytes;
- a presence condition (data actually present or not present in memory) indicating that the user data is to be present or not present in the second memory zone;
- a location (e.g. a memory address) in the second memory zone;
- a value;
- a threshold;
- a content value; and
- a predetermined data state.

The above list of criteria is given by way of illustration and is not limiting in any way. Other types of criteria may be used by the person skilled in the art.

In an implementation, the method further comprises the following steps:
- receiving an updating command comprising first updating data relating to the operating system in association with the second updating data relating to the data model; and
- updating the operating system from the first updating data and updating the data model from the second updating data.

In a particular implementation, said determination of whether said user data complies with said at least one criterion defined in the data model is performed on detecting that the data model has been updated using the second updating data. By way of example, this determination applies to all of the user data present in the second memory zone.

In an implementation, the step of determining whether said user data present in the second memory zone complies with said at least one criterion defined in the data model is performed in response to the operating system being updated by using the first updating data. In a particular example, this determination step is performed on all of the user data present in the second memory zone once the operating system has been updated.

In an implementation, the step of determining whether said user data present in the second memory zone complies with said at least one criterion defined in the data model is performed in response to the operating system and the data model being updated by using respectively the first updating data and the second updating data. In a particular example, this determination step is performed on all of the user data present in the second memory zone once the operating system and the data model have been updated.

In a particular implementation, the various steps of the processing method are determined by computer program instructions.

Consequently, the invention also provides a computer program on a data medium (or a recording medium), the program being suitable for being performed in an embedded subscriber identity module, such as a SIM card or an eUICC module, or more generally in a computer, the program including instructions suitable for performing steps of a processing method as identified above.

The program may use any programming language, and it may be in the form of source code, object code, or code intermediate between source code and object code, such as in a partially compiled form, or in any other desirable form.

The invention also provides a data medium (or a recording medium) that is readable by a computer, and that includes instructions of a computer program as specified above.

The data medium may be any entity or device capable of storing the program. The medium may comprise storage means, such as a read only memory (ROM) or a flash memory, for example.

Furthermore, the data medium may be a transmissible medium such as an electrical or optical signal that can be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show embodiments having no limiting character. In the figures.

DETAILED DESCRIPTION OF A PLURALITY OF EMBODIMENTS

In known manner, an embedded subscriber identity module, such as a SIM card, for example, is an electronic device containing a microcontroller and a memory, and suitable for use in mobile telephony to store data that is specific to a subscriber of a mobile network, in particular for the GSM, UMTS, and LTE networks, for example. An embedded subscriber identity module also serves to store data and applications of the user, of the user's operator, and under certain circumstances of third parties.

An embedded subscriber identity module enables a mobile communications terminal with which it co-operates (such as a cell phone, for example) to make use of the mobile communications network of a single telephone operator. For this purpose, the embedded subscriber identity module includes subscription data, such as for example, an international mobile subscriber identity (IMSI), cryptographic keys, or indeed algorithms given by the operator of the mobile network.

A SIM card may present a variety of form factors (or formats), and it constitutes an example of an embedded subscriber identity module in the meaning of the invention, which example is characterized in particular in that it is removable from its host terminal. Other embedded subscriber identity modules in the meaning of the invention may be permanently fastened or integrated in the host terminal, as applies to embedded SIM cards (known as eSIM or eUICC cards), or indeed by the above-mentioned eSEs.

The use of eSIM cards has become more widespread in the last few years. These reprogrammable modules enable a user to change operator without needing to physically replace the SIM card in the cell phone. The main specifications for an eUICC module are defined by the global system for mobile communications association (GSMA) group in its GSMA standard SGP.02 v3.2 entitled "Remote provisioning architecture for embedded UICC—technical specification—Version 3.2" dated Jun. 27, 2017, and in the GSMA standard SGPO.22 v.2.2 entitled "RSP technical specification—Version 2.2" dated Sep. 1, 2017. An eUICC module is also a secure element, generally of small size, that can be integrated in the communications terminal (e.g. a mobile terminal) in order to perform the functions of a conventional SIM card. In this document, examples of the invention are described in the context of a SIM card. Nevertheless, it should be understood that the invention is applicable more generally to any embedded subscriber identity module, such as a SIM card, an eUICC (or eSIM) module, or indeed an eSE, for example, as explained above.

The invention proposes configuring an embedded subscriber identity module so as to avoid the errors of bugs that can occur, in particular as a result of updating its operating system. To do this, various embodiments of the invention provide an embedded subscriber identity module storing in memory a data model that enables the operating system to determine whether the user data accessible thereto in the memory of said module does or does not comply with the expectation of the operating system, thereby enabling the operating system to behave in an appropriate manner when the data is not in compliance.

Unless specified to the contrary, elements that are common or analogous in more than one of the figures are given the same reference signs and they present characteristics that are identical or analogous, such that these common elements are generally not described again for reasons of simplicity.

Figure 1:
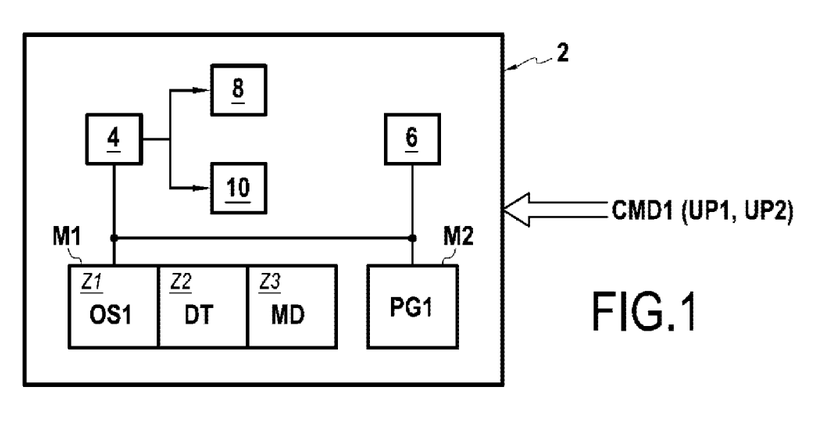
FIG. 1 is a diagram of an embedded subscriber identity module.

FIG. 1 is a diagram showing the structure of an embedded subscriber identity module 2 in accordance with a particular embodiment. In this example, the module 2 is a SIM card, but other examples are possible.

It is assumed by way of example that the SIM card 2 is for embedding in a mobile terminal (not shown in the figure), such as a cell phone of the smartphone type, for example, so as to enable a user to be authenticated with a mobile network. The mobile terminal can thus co-operate with the SIM card 2 in order to access functions (and/or services) made available by the mobile network of the operator in question. The structures of the mobile terminal and of the mobile network are not described in detail in this embodiment since that is not useful for understanding the principle of the invention.

As shown in FIG. 1, the SIM card 2 comprises a processor 4, a first non-volatile memory M1, a second non-volatile memory M2, and a communications interface 6.

The communications interface 6 is configured to enable the SIM card 2 to communicate with the outside, in particular in this example with a mobile telecommunications terminal (not shown) in which it is possible to embed the SIM card.

In this example, the non-volatile memory M1 has three distinct memory zones, namely: a first memory zone Z1, a second memory zone Z2, and a third memory zone Z3. The first memory zone Z1 is configured to store in memory an operating system or OS, written OS1. The second memory zone Z2 is configured to store user data DT in memory that is accessible by the operating system OS1. Finally, the third memory zone Z3 is configured to store in memory a data model MD that is described below.

By way of example, the memory M1 is a rewritable non-volatile memory of the flash, electrically erasable programmable read-only memory (EEPROM), or other type. Although the memory zones Z1 to Z3 are shown herein as being within a single memory M1, it should be understood that the memory zones may be constituted by memories (or memory devices) that are distinct. In general manner, a memory zone in the meaning of the invention may be a "logical" and/or a "physical" memory. By way of example, the memory zones Z1, Z2, and Z3 in the meaning of the invention may each correspond to a specific address within a single physical memory (component). Alternatively, each of the memory zones Z1, Z2, and Z3 in the meaning of the invention may occupy a different physical memory. In another variant, the memory zones Z1, Z2, and Z3 in the meaning of the invention then correspond to two distinct memory addresses within a given partition and to a third address within another partition, or indeed to a mixture of possible configurations between logical memory and/or physical memory (a component).

The processor 4 controls the operation of the SIM card 2 by co-operating with the other internal components of the SIM card. In particular, the processor 4 running the operating system OS1 accesses the necessary data in the memory zones Z2 and Z3.

The user data DT (also known as subscriber data) stored in the second memory zone Z2 may be any data specific to a user of the SIM card 2. By way of example, the user data may comprise at least one of the following: an intentional mobile subscriber identity (IMSI); at least one cryptographic key; and at least one algorithm, all of these elements being allocated to the user of the SIM card 2 by an operator of a mobile network.

When a mobile communications terminal seeks to make use of the services of a mobile network, it can send the user data stored in the SIM card 2 as needed by the operator of the network in order to allow access to the requested services. The operator can thus identify the user and make use of a home location register (HLR) database in order to verify that the user has indeed subscribed to the requested service.

As described below, the user data DT stored in the second memory zone Z2 may, by way of example, include metadata characterizing said data DT, e.g. in terms of format and/or type, of size or length, of position, or indeed of state (encrypted, non-encrypted, etc.).

The data model MD stored in the third memory zone Z3 is constituted by a data set characterizing the user data DT stored (or supposed to be stored) in the second memory zone Z2. By way of example, the data model MD enables the operating system OS1 to determine the type and/or format that should in theory be complied with by the user data DT present in the memory zone Z2. For this purpose, the data model MD defines at least one criterion that should be complied with by all or some of the user data DT. These criteria define the forms in which the user data DT should be presented in order to enable the operating system OS1 to read the data and use it correctly. By way of example, this criterion may comprise at least one characteristic (type, format, position, state, . . . ) that should be complied with by some or all of the user data DT.

In a particular embodiment, the user data DT is situated in a memory, that may optionally be of secure type, and that is outside the embedded subscriber identity module, e.g. in a memory of the mobile telecommunications terminal in which the embedded subscriber identity module is embedded, or even in a remote server.

The invention relies on the principle that the user data DT need not necessarily be in the form required by the operating system OS1 for normal and optimum operation. This situation may occur in particular after the operating system OS1 has been updated, insofar as such updating might, in particular, modify the data format required by the operating system in order to operate appropriately. In certain circumstances, the type, the format, the state, the length, the presence, the location, and/or the position of user data DT does not comply with the expectations of the operating system OS1. As described below, the data model MD enables the operating system OS1 to detect when the user data DT does not comply with expectations, and also enables the operating system OS1 to respond in appropriate manner when such a situation occurs.

As shown in FIG. 1, the SIM card 2 may for example be configured to receive via its communications interface 6 an updating command CMD1 for updating the operating system OS1 of the SIM card 2. As set out below, the updating command CMD1 may include first updating data UP1 relating to the operating system OS1, associated with the second updating data UP2 relating to the data model MD. This data UP1 and UP2 serves respectively to update the operating system OS1 and to update the data model MD in the corresponding memory zones of the SIM card 2.

Furthermore, the memory M2 is a rewritable non-volatile memory or a ROM, this memory constituting a data medium (or recording medium) in accordance with a particular embodiment that is readable by the SIM card 2 and that stores a computer program PG1 in accordance with a particular embodiment. This computer program PG1 includes instructions for executing steps of a processing method in a particular implementation as described below in particular examples.

As shown in FIG. 1, the processor 4 controlled by the computer program PG1 in this example provides a determination module 8 and a processing module 10.

The determination module 8 is configured to determine whether the user data DT stored in the second memory Z2 complies with at least one criterion defined in the data model MD.

The processing module 10 is configured to cause at least one first predetermined action, as defined in the data model MD, to be executed if some or all of the user data DT does not comply with said at least one criterion.

The operation of the SIM card 2, and in particular of the above-mentioned modules 8 and 10, appears in greater detail from the examples described below with reference to FIGS. 3 to 6. It can be understood that the modules 8 and 10 as shown in FIG. 1 merely represent one non-limiting embodiment of the invention.

It should also be observed that certain elements that are generally present in a SIM card have voluntarily been omitted since they are not needed for understanding the present invention.

The steps of a processing method in a particular implementation of the invention are described below with reference to FIG. 2. This method is performed by the SIM card 2, and more particularly by the processor 4 executing the computer program PG1. This processing method comprises the following steps:

determining (S2) whether the user data DT stored in the memory zone Z2 complies with at least one criterion CT defined in the data model MD; and triggering (S4) execution of at least one first predetermined action AT1, as defined in the data model MD in association with the user data DT in question, if said user data DT is not in compliance with said at least one criterion.

In other words, the SIM card 2 acts in S2 to verify whether some or all of the user data DT compiles with at least one criterion CT defined in the data model MD, and in the event of non-compliance, the SIM card 2 executes at least one first action AT1 defined for this purpose in the data model MD. The first action(s) AT1 as triggered in this way may be of any kind and may be adapted depending on circumstances of use.

By way of example, the above-described steps S2 and S4 may be performed after the operating system OS1 has been updated, e.g. in response to an updating command CMD1 (FIG. 1). By way of example, the steps S2 and S4 are performed by the SIM card 2 on detecting that the operating system OS1 has been updated.

By way of example, said first predetermined action AT1 may comprise predetermined modification of the non-compliant user data DT.

In this example, an object of the invention is to enable the operating system OS1 to respond appropriately when user data DT present in the memory zone Z2 is not (or is no longer) in the expected form, e.g. as a result of the operating system OS1 being updated, as explained above.

The invention serves advantageously to avoid errors or bugs arising when the operating system OS1 of the SIM card 2 accesses user data DT in the memory zone Z2, which data is not in the form that is expected or required by said operating system OS1.

Figure 3:
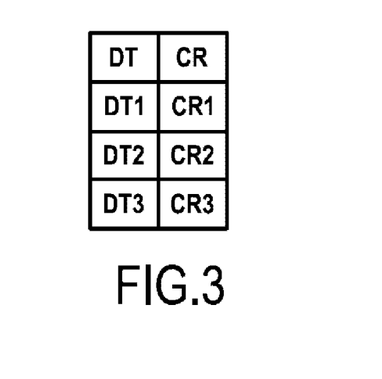
FIG. 3 is a diagram representing user data stored in memory in an embedded subscriber identity module, in accordance with a particular implementation of the invention.
Figure 4:
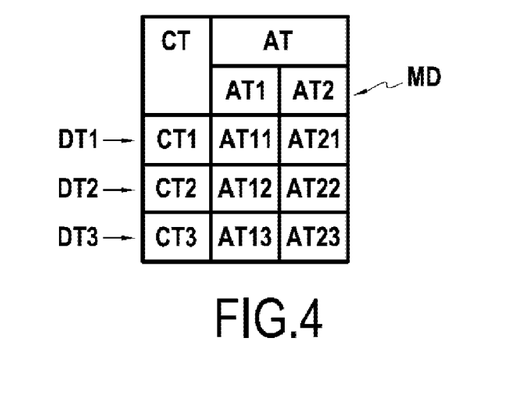
FIG. 4 is a diagram representing a data model in accordance with a particular implementation of the invention.
Figure 5:
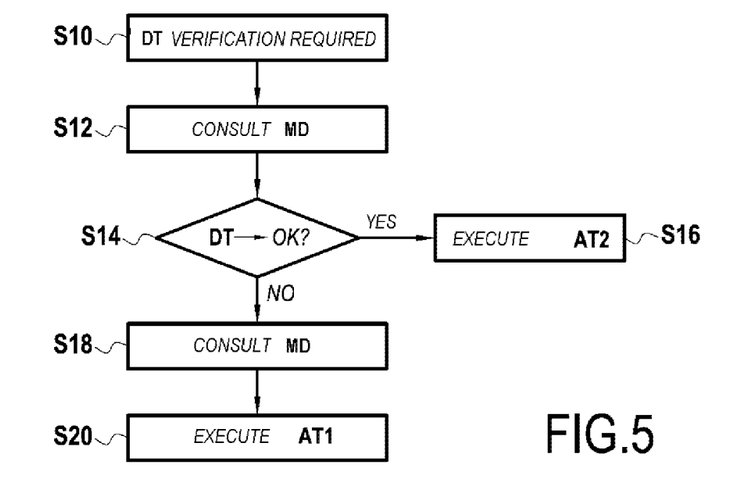
FIG. 5 is a flow chart showing the steps of a processing method in accordance with a particular implementation of the invention.

With reference to FIGS. 3-5, there follows a description of how a processing method in a particular implementation is performed. The method is performed by the SIM card 2 shown in FIG. 1, and more particularly by the processor 4 executing the computer program PG1.

As shown in FIG. 3, it is assumed that the user data DT stored in the second memory zone Z2 comprises three sets of user data DT1, DT2, and DT3. The sets of user data DT1, DT2, and DT3 present respective sets of characteristics CR1, CR2, and CR3 (referred to collectively as CR). By way of example, these sets of characteristics define the format, the type, the length, the position, the location, the presence, and/or the state (e.g. encrypted or non-encrypted) of the corresponding user data. In a particular example, the sets of characteristics CR1-CR3 of the sets of user data DT1-DT3 are accessible to the operating system OS1 in the form of metadata stored in the second memory Z2 in association with the corresponding sets of user data DT. Each of the sets of user data DT stored in the memory zone Z2 may include metadata characterizing the type and/or the format of the data, the size or the length of the data, its encrypted or non-encrypted state, its position, its location, its presence, etc.

In the examples envisaged in this document it should be observed that each of the sets of user data DT1, DT2, and DT3 (FIG. 3) may comprise an arbitrary quantity of data. The nature of the content of this data may also vary depending on circumstances, as already explained.

As shown in FIG. 4, it is also assumed that the data model MD stored in the third memory zone Z3 in this example comprises information characterizing each of the sets of user data DT1-DT3.

More precisely, the data model MD defines sets of criteria CT1, CT2, and CT3 (referred to collectively as CT) associated with the respective sets of user data DT1, DT2, and DT3.

It should be observed that each of the sets of criteria CT1-CT3 may comprise one or more criteria applying to the corresponding user data DT. It should also be observed that the same set of criteria CT may be defined in the data model MD for at least two distinct sets of user data DT. For reasons of simplicity, it is assumed in this example shown in FIGS. 3 and 4 that each set of criteria CT is constituted by a single criterion that each corresponding set of user data DT must comply with.

In this example, the data model MD also defines actions AT1 and AT2 (referred to collectively as AT) that are referred to respectively as "first" actions and as "second" actions for performing in association with each of the sets of user data DT1, DT2, and DT3. More precisely, and as shown in FIG. 4, it is assumed herein that the data model MD defines:

a first action AT11 and a second action AT21 associated with the set of user data DT1;
  a first action AT12 and a second action AT22 associated with the set of user data DT2; and
  a first action AT13 and a second action AT23 associated with the set of user data DT3.

It should be observed that each of the first actions referred to collectively as AT1 and each of the second actions referred collectively as AT2 may comprise one or more predefined actions. It should also be observed that a given action AT may be defined in the data model MD for at least two distinct sets of user data DT. For reasons of simplicity, in this example as shown in FIGS. 3 and 4, it is assumed that each first and second action AT1, AT2 is constituted by a single action to be performed by the operating system OS1.

Each first action AT1 in the meaning of the invention defines an action that the operating system OS1 is to perform if the corresponding user data CT is not in compliance with the criterion CT that is applicable in accordance with the data model MD. Each first predetermined action AT1 may be arbitrary, and by way of example it may comprise performing a predetermined modification on the non-compliant user data DT.

Conversely, each second action AT2 in the meaning of the invention defines an action that the operating system OS1 is to perform if the corresponding user data DT is in compliance with the criterion CT that is applicable in accordance with the data model MD. Each second predetermined action may be arbitrary, and in a particular example it does not lead to any modification of the corresponding user data DT that is judged to be in compliance.

The person skilled in the art can thus understand the flexibility made available by the ability to define first actions AT1 and second actions AT2 in specific and dedicated manner for each of the sets of user data DT under consideration or in a manner that is common to a plurality of distinct sets of user data DT.

In general manner, the data model MD may define at least one criterion CT in association with at least one first action AT1, and possibly with at least one second action AT2.

In a particular implementation, if no second action AT2 is defined by the data model MD for a given set of user data DT, then when the user data DT is in compliance with the applicable criterion CT, the operating system OS1 does not perform any modification on the user data DT.

In a particular implementation, the data model MD defines at least one criterion CT and at least one second action AT2 in association with the user data DT, but does not define any first action AT1. In the event of the user data DT not being in compliance, the operating system OS1 does not modify said user data DT in question, and may possibly issue an error message.

In a particular implementation, the data model MD defines at least one criterion CT in association with user data DT but no first action AT1 nor any second action AT2.

Other implementations are also possible without being described herein for reasons of simplicity and clarity. The implementations described in this document thus do not constitute any limit on the implementations of the present invention.

In a particular implementation, the processing method performed by the SIM card 2 in the example shown in FIGS. 3 and 4 takes place as described below with reference to FIG. 5.

During a step S10, the SIM card 2 detects that verification of the compliance of at least one set of user data DT is required. In the example below, it is assumed that verification of the compliance of the set of user data DT2 is required.

In a particular example, the SIM card 2 determines (S10) that it is necessary to verify the compliance of the set of user data DT2 on detecting that the operating system OS1 has been updated.

In a particular example, prior to the step S10, the SIM card 2 updates its operating system OS1, e.g. in response to receiving a command to update the OS. The SIM card 2 then determines (S10) that it is necessary to verify the compliance of the set of user data DT2 on detecting that the operating system OS1 has been updated. In a particular example, the SIM card 2 then determines (S10) that verification of the compliance of all of the sets of user data DT present in the memory zone Z2 is required. When the operating system OS1 is updated, it might change configuration and require user data DT that is different from the user data required in its previous configuration. By verifying the compliance of user data DT after updating the operating system, it is possible in effective manner to avoid problems of incompatibility between the updated operating system and the user data, as explained above.

In a particular example, the SIM card 2 determines (S10) that it is necessary to verify the compliance of the set of user data DT2 on detecting that a request is made to read the set of user data DT2 in the memory zone Z2. Compliance is then verified on the fly, each time a request is made to read user data DT.

In the presently-considered example, on detecting (S10) that verification of compliance of the set of user data DT2 is required, the SIM card 2 acts during a consultation step S12 to consult the data model MD in the third memory zone Z3 and to determine the criterion or the criteria CT that, according to the data model MD, need(s) to be complied with by the set of user data DT2. In this example, the SIM card 2 thus detects during S12 that the set of criteria CT2 is applicable to the set of user data DT2, as shown in FIG. 4.

During a determination step S14, the SIM card 2 determines whether the set of user data DT2 that is to be verified complies with the corresponding set of criteria CT2 as defined in the data model MD. To do this, the SIM card 2 accesses the user data DT2 in the memory zone Z2 and compares it with the applicable set of criteria CT2 in order to determine whether it is or is not compliant. If the set of user data DT2 is detected as complying with the specification in the data model MD, then the method continues with S16. Otherwise (non-compliance), the method continues with S18.

During step S18 (DT2 non-compliant), the SIM card 2 consults the data model MD in the third memory zone Z3 once more in order to determine said at least one first predetermined action AT1 defined by the data model MD in association with the set of user data DT2, namely: the action AT12 in the present situation.

During an execution step S20, the SIM card 2 then executes the predetermined action AT12 in compliance with the specifications of the data model MD.

This first predetermined action AT12 may comprise performing any set of instructions (program portion) that is pre-stored in the data model MD. The predetermined action AT12 may comprise the operating system OS1 modifying the set of user data DT2. The type of modification involved may vary depending on the situation (e.g. a change of length, a change of type, encrypting the user data, updating the value of the content of the user data, . . . ).

In a particular example, during the first consultation in S12, the SIM card 2 determines said at least one first predetermined action AT12 defined by the data model MD in association with the set of user data DT2. Under such circumstances, there is no need to perform this operation again in S18.

In contrast, if the set of user data DT2 complies with the set of criteria CT2 (step S14; FIG. 5), the SIM card 2 operates normally, i.e. as defined for example by the program of the operating system OS1. In a particular example, during the step S16, the operating system OS1 causes at least one second predetermined action AT2 to be executed, specifically the action AT22 in the present situation. In this example, this second predetermined action AT22 is different from said at least one first predetermined action AT1 (i.e. AT12 in this situation) requested by the data model MD in the event of detecting (in S14) non-compliance of the set of user data DT2.

In a particular example, said at least one second predetermined action AT2 is defined in the data model MD in association with the user data DT for which verification of compliance is required. The data model MD can define certain instructions enabling the operating system OS1 to determine which action AT2 is to be performed in S16. In a particular example, the action AT2 is specified in the operating system OS1 and the data model MD includes an instruction causing the operating system OS1 to execute this action. The SIM card 2 can then consult the data model MD once more to determine AT2, or it might already have determined AT2 during the consultation in S12.

In another example, said at least one second predetermined action AT2 is not defined in the data model MD. In other words, no consultation of the data model MD is performed (or necessary) in order to determine said at least one second predetermined action AT2 that is executed by the operating system OS1 in S16.

In a particular example, said at least one second predetermined action AT2 performed in S16 is specified in the operating system OS1.

Figure 2:
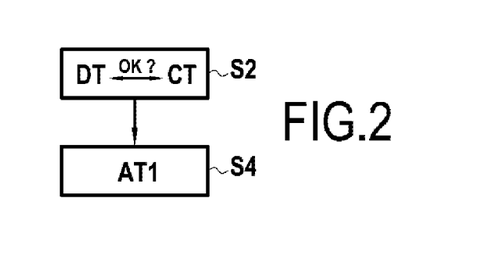
FIG. 2 is a flow chart of the steps of a processing method in a particular implementation of the invention.

Particular examples applied to the method of FIG. 2 or FIG. 5 are described below.

Example 1 if the user data DT is detected in S4/S14 as being of a type or format that does not comply with that specified by the data model MD (e.g. wrong identifier AID for an applet, incorrect file type: binary, cyclical or linear, . . . ), then the operating system OS1 runs a predefined script AT1 or abandons an operation of reading the data DT in question);

Example 2 if the user data DT is detected in S4/S14 as being longer or more voluminous than a predefined threshold value L1 defined in a criterion CT, then the operating system OS1 reads the n first or last bits (or bytes) of the user data DT in question (where n is a natural integer), and it ignores the remaining bits (or bytes);

Example 3 if the user data DT is detected in S4/S14 as being shorter or less voluminous than a predefined threshold value L2 defined in a criterion CT, then the operating system OS1 adds to the user data DT in question as many "padding" bits (or bytes) as there are missing bits (or bytes), e.g. padding of value zero (in the "0" state) in order to obtain user data DT of the size required by the threshold value L2; and Example 4 if the use data DT is detected in S4/S14 as not being situated in a predefined position in the memory zone Z2 (incorrect memory address for the data DT), then the operating system OS1 looks for the user data DT in question at some other predefined position in the memory zone Z2 or else abandons an operation of reading said user data, or indeed runs a predefined script (executes a calculation, takes account of a default value, . . . ).

Figure 6:
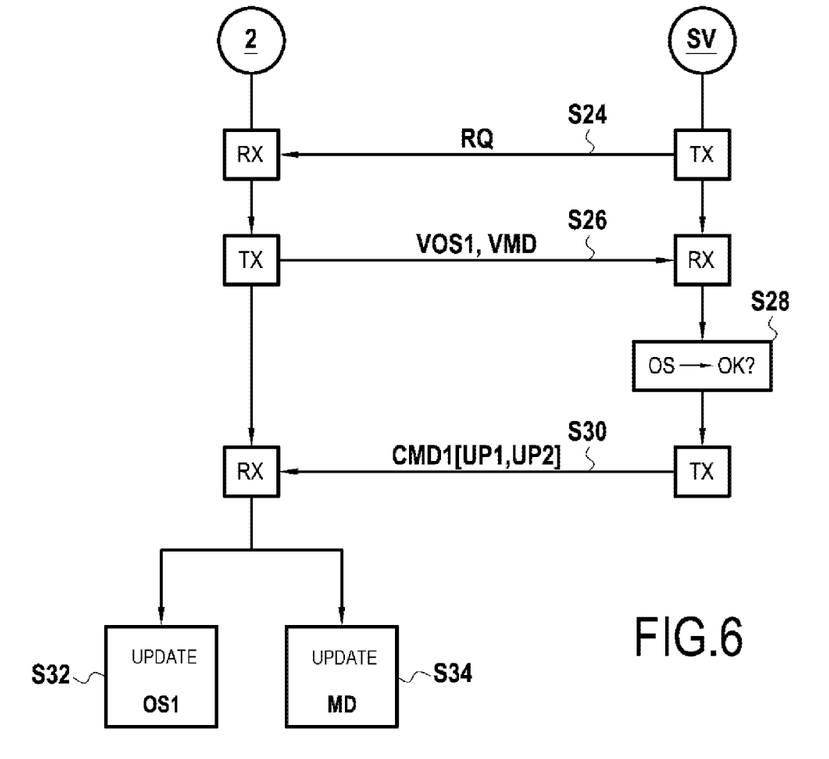
FIG. 6 is a data exchange diagram showing the steps of a processing method in accordance with a particular implementation of the invention.

In a particular example shown in FIG. 6, the processing method shown in FIG. 2 or FIG. 5 further comprises the following steps performed by the SIM card 2 (FIG. 1):

receiving (S30) an updating command CMD1 comprising first updating data UP1 relating to the operating system OS1 in association with the second updating data UP2 relating to the data model MD; and updating (S32) the operating system OS1 with the first updating data UP1, and updating (S34) the data model MD with the second updating data UP2.

By way of example, the updating command CMD1 is received in S30 from a remote server SV via a mobile communications terminal in which the SIM card 2 is embedded (or that co-operates therewith).

From the data UP1 comprised in the received command CMD1, it is thus possible to update the operating system OS1, e.g. in order to correct bugs or to add new functions. From the data UP2 comprised in the received command CMD1, it is also possible to update the data model MD so that it specifies to the operating system OS1 the expected form for user data DT (criterion CT) and also the processing that is to be performed (first action AT1) in the event that the user data DT does not comply with what is expected by the operating system OS1. These operations of updating the operating system OS1 and the model MD are performed without the user data DT being updated.

Once the steps S32 and S34 have been performed, the operating system OS1 is capable of using the user data DT in the memory zone Z2 by using the updated data model MD.

In general manner, the updating command CMD1 received in S30 by the SIM card 2 may comprise at least one of the above-described data UP1 and data UP2.

In a particular implementation, the updating command CMD1 comprises only first updating UP1 relating to the operating system OS1. The SIM card 2 then updates S32 the operating system OS1 from the data UP1, but does not perform the step S34. Once step S32 has been performed, the updated operating system OS1 becomes capable of using the user data DT in the zone Z2 with the help of the data model MD.

In a second implementation, the updating command CMD1 comprises only the second updating data UP2 relating to the data model MD. The SIM card 2 then updates S34 the model MD with the data UP2, but does not perform the step S32. Once the step S34 has been performed, the operating system OS1 becomes capable of using the user data DT in the zone Z2 with the help of the updated data model MD.

In a particular example, the SIM card 2 detects in S10 (FIG. 5) that the compliance of the user data DT needs to be verified (possibly all of the user data present in the second memory zone Z2), on detecting that the data model MD and/or the operating system OS1 has been updated.

Some or all of the steps shown in FIG. 6 may be performed prior to executing S2 (FIG. 2) or S10 (FIG. 5), as described above. It is thus possible, by way of example, for the operator of a mobile network to update the operating system OS1 of the SIM card 2 and/or the data model MD and to configure the operating system OS1 so as to manage situations in which the user data stored in memory is no longer compatible with the operating system OS1.

In a particular example (FIG. 6), prior to step S30, the SIM card 2 receives (S24) an updating request RQ coming from the remote server SV. In response to this request RQ, the SIM card 2 sends (S26) to said server SV the version VOS1 of the operating system OS1 stored in the memory zone Z1, and possibly also the version VMD of the data model MD stored in the memory zone Z3. The remote server SV then uses VOS1 (and optionally VMD) to determine (S28) whether the operating system OS1 is up to date, and if not it sends (S30) the updating command CMD1 (FIG. 1), as described above. By way of example, this command CMD1 comprises a file for updating both the operating system OS1 and the data model MD. In this example, this updating file comprises both the updating data UP1 and the updating data UP2 relating respectively to the operating system OS1 and to the data model MD, as explained above. As explained above, the SIM card 2 then proceeds: to receive (S30) the updating command CMD1, then to update (S32) the operating system OS1, and then to update (S34) the data model MD, and to do so without modifying the user data DT.

In a particular example, the SIM card 2 sends (S26) (FIG. 6) at least one of VOS1 and VMD to the server SV. In S28, the server SV then uses VOS1 and/or VMD to determine whether the operating system OS1 in Z1 and/or the data model MD in Z3 are respectively up to date, and if not, it sends (S30) the updating command CMD1 (FIG. 1) comprising at least one of UP1 and UP2 as needed for updating.

The person skilled in the art understands that the above-described embodiments and variants merely constitute non-limiting examples of how to implement the invention. In particular, the person skilled in the art can envisage any adaptation or combination of the above-described embodiments or variants for satisfying some particular need.

The invention claimed is:

1. An embedded subscriber identity module comprising:
   a first memory zone configured to store an operating system in memory; and
   a second memory zone configured to store user data in memory that is accessible by the operating system;
   a third memory zone, distinct from the first memory zone and the second memory zones, configured to store a data model in memory defining at least one criterion that is to be complied with by the user data contained in the second memory zone;
   a determination module configured to determine whether said user data complies with said at least one criterion; and
   a processor module configured to cause at least one first predetermined action as defined in the data model to be executed if said user data is not in compliance with said at least one criterion.

2. An embedded subscriber identity module according to claim 1, wherein the determination module is configured, on detecting that the operating system has been updated, to determine whether said user data complies with said at least one criterion.

3. An embedded subscriber identity module according to claim 1, configured, if the user data is not in compliance with said at least one criterion:
   to consult the data model in the third memory zone in order to determine said at least one first predetermined action; and
   to cause the operating system to execute said at least one first predetermined action.

4. An embedded subscriber identity module according to claim 1, wherein if said user data complies with said at least one criterion, the operating system is configured to execute at least one second predetermined action, different from said at least one first predetermined action.

5. An embedded subscriber identity module according to claim 4, wherein said at least one second predetermined action is defined in the data model in association with said user data.

6. An embedded subscriber identity module according to claim 1, wherein said at least one criterion comprises at least one of the following:
   a predetermined data type;
   a predetermined length or format for a string of data bits or bytes;
   a predetermined bit or byte position in a given string of bits or bytes;
   a presence condition indicating that the user data should or should not be present in the second memory zone;
   a location in the second memory zone;
   a value;
   a threshold;
   a content value; and
   a predetermined data state.

7. An embedded subscriber identity module according to claim 1, wherein the data model defines a plurality of criteria to be satisfied by the user data;
   the determination module being configured to determine whether the user data complies with each of said plurality of criteria; and the processor module being configured to perform at least said at least one first predetermined action defined in the data model if said user data does not comply with at least one of said plurality of criteria.

8. An embedded subscriber identity module according to claim 1, comprising an updating module configured:
   to receive an updating command comprising first updating data relating to the operating system in association with second updating data relating to the data model; and
   to update the operating system from the first updating data and to update the data model from the second updating data.

9. An embedded subscriber identity module according to claim 8, wherein the determination module is configured to determine whether said user data present in the second memory zone complies with said at least one criterion defined in the data model after the data model has been updated using the second updating data.

10. A processing method performed by an embedded subscriber identity module comprising:
   a first memory zone storing an operating system;
   a second memory zone storing user data accessible by the operating system; and
   a third memory zone, distinct from the first memory zone and the second memory zone, storing a data model defining at least one criterion that is to be complied with by the user data contained in the second memory zone;
   the method comprising the following steps:
   determining whether said user data complies with said at least one criterion defined in the data model; and
   if said user data is not in compliance with said at least one criterion, triggering execution of at least one first predetermined action defined in the data model.

11. A method according to claim 10, comprising updating the operating system in the first memory zone; and
   wherein the determining of whether the user data complies with said at least one criterion defined in the data model is performed on detecting that the operating system has been updated.

12. A method according to claim 10, wherein if said user data does not comply with said at least one criterion, the triggering comprises:
   consulting the data model in the third memory zone in order to determine said at least one first predetermined action; and
   triggering the operating system to execute said at least one first predetermined action.

13. A method according to claim 10, wherein if said user data complies with said at least one criterion, the operating system is configured to execute at least one second predetermined action, different from said first predetermined action.

14. A method according to claim 10, further comprising:
   receiving an updating command comprising first updating data relating to the operating system in association with second updating data relating to the data model; and
   updating the operating system from the first updating data and updating the data model from the second updating data.

15. A method according to claim 14, wherein said determining whether said user data complies with said at least one criterion defined in the data model is performed on detecting that the data model has been updated using the second updating data.

16. A non-transitory computer readable media including instructions that are executed by a computer of an embedded subscriber identity module comprising:
   a first memory zone storing an operating system;
   a second memory zone storing user data accessible by the operating system; and
   a third memory zone, distinct from the first memory zone and the second memory zone, storing a data model defining at least one criterion that is to be complied with by the user data contained in the second memory zone;
   wherein the instructions cause the computer to perform a method comprising:
   determining whether the user data complies with the at least one criterion defined in the data model; and
   if the user data is not in compliance with the at least one criterion, triggering execution of at least one first predetermined action defined in the data model.

* * * * *

UNITED STATES PATENT AND TRADEMARK OFFICE
CERTIFICATE OF CORRECTION

Page 1 of 1

PATENT NO. : 10,809,930 B2
APPLICATION NO. : 16/284492
DATED : October 20, 2020
INVENTOR(S) : Aurélien Raboisson and Jérôme Dumoulin It is certified that error appears in the above-identified patent and that said Letters Patent is hereby corrected as shown below:

In the Claims

Column 16, Line 14, delete "and the second memory zones, configured to store a", and insert therefor --and the second memory zone, configured to store a--.

Column 17, Line 28, delete "the method comprising the following steps:", and insert therefor --the method comprising:--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*